3,153,596
PLASTER COMPOSITIONS
Arthur Glover Tallentire and Cecil Green, Norton-on-Tees, England, assignors to Imperial Chemical Industries Limited, London, England, a corporation of Great Britain
No Drawing. Filed Mar. 1, 1961, Ser. No. 92,447
Claims priority, application Great Britain, Mar. 9, 1960, 8,260/60
6 Claims. (Cl. 106—115)

The present invention relates to plaster compositions, that is to compositions which, when mixed with an appropriate quantity of water, give plasters which are suitable for application by conventional means to wall and other surfaces, and which will set to give a hard and even finish.

Hitherto it has been customary to apply plaster to wall and similar surfaces in two or more layers, which are generally referred to as coats, but we have now found that the plaster compositions according to the present invention enable entirely satisfactory results to be obtained with one coat only.

According to the present invention there are provided dry plaster compositions which comprise an intimate mixture of a calcium sulphate plaster and exfoliated vermiculite, in the proportions by weight of from 12:1 to 1:1 together with from 0.01% to 2% by weight of finely divided methylcellulose based on the total weight of the calcium sulphate plaster and vermiculite.

Calcium sulphate plasters which may be used in the compositions of the present invention include retarded calcium sulphate hemihydrate and accelerated anhydrous calcium sulphate plasters. It will be understood that a retarded calcium sulphate hemihydrate plaster contains at least one conventional retarding agent, for example keratin, and that an accelerated anhydrous calcium sulphate plaster comprises anhydrous calcium sulphate and a catalyst, for example as described in British patent specification No. 554,952.

The exfoliated vermiculite may be graded or ungraded over a wide size range, for example from $150\mu$ to $3000\mu$. Preferably however the grading should be in the range of $300\mu$ to $2400\mu$ and the methylcellulose should have a fineness of less than $150\mu$.

It has further been found that the rate of hardening of the plasters prepared from the plaster compositions of the present invention may be enhanced by adding to the compositions from 5% to 25% by weight of dry hydrated lime based on the weight of the calcium sulphate plaster in the compositions.

Alternatively, an enhancement of the rate of hardening of the resulting plasters may be obtained by treating the exfoliated vermiculite to be used in the plaster compositions with a waterproofing agent, for example a volatile silane such as methyl trichlorsilane, in the proportion of from 0.1 to 1.0 cubic centimetre of the liquid to every 100 grams of the vermiculite.

The plaster compositions of the present invention may conveniently be produced by mixing the dry components in a mixer which is suitable for the intimate mixing of dry powders, the desired quantity of exfoliated vermiculite being added to that of the calcium sulphate plaster in the mixer and these two components thoroughly mixed until a substantially uniform distribution of the one in the other is obtained. The desired quantity of finely divided methylcellulose is then added and the mixing continued for sufficient time to ensure that the methylcellulose is substantially uniformly distributed throughout the dry mix of the other two components.

When hydrated lime is to be included in the compositions it is preferably added before the methylcellulose.

Alternatively the desired quantities of dry hydrated lime and methylcellulose may be mixed together in a separate operation and then added to and mixed with a previously mixed dry mass of the desired quantities of calcium sulphate plaster and exfoliated vermiculite.

In preparing plasters from the plaster compositions of the present invention the requisite quantity of water may be mixed therewith by any conventional method, for example by means of a hand mixing tool using a wooden platform or a suitable receptacle. Alternatively a simple mechanical mixing device may be used. It will be understood that the quantity of water used with any particular composition will be that needed to produce a plaster of satisfactory consistency for applying to walls or other surfaces, as the case may be, by conventional means, for example by trowel or spray gun.

A particularly useful plaster composition for preparing plaster for application to most surfaces is one comprising 1300 parts by weight of retarded calcium sulphate hemihydrate, 200 parts by weight of exfoliated vermiculite and 4 parts by weight of methylcellulose.

Examples of plaster compositions according to the present invention which are particularly suitable for the preparation of plasters having enhanced rates of hardening are given in the following table in which parts are by weight.

|  | Example 1 | Example 2 | Example 3 | Example 4 |
| --- | --- | --- | --- | --- |
| Retarded calcium sulphate hemihydrate | 1,250 | 1,020 | 2,040 | 2,040 |
| Exfoliated vermiculite | 260 | 130 | 520 | 260 |
| Hydrated lime | 160 | 160 | 320 | 500 |
| Methylcellulose | 4 | 4 | 8 | 6 |

The presence of the exfoliated vermiculite and of the methylcellulose enables plasters prepared from the plaster compositions of the present invention to be applied in one coat and to be trowelled to an acceptable finish. The presence of the methylcellulose in particular enables the wet plaster to retain water against the absorbing tendency of the surface to which it has been applied and thus allows the plaster to set evenly and homogeneously even when applied to surfaces which are irregular and/or have large variations in their tendency to absorb water from the wet plaster.

The plasters prepared from the plaster compositions of the present invention have the additional advantages over those hitherto used in that no preparation, for example wetting, of the surfaces to which they are to be applied is needed, they have exceptional adhesion to all surfaces, they have substantially no tendency to crack or craze and they are light in weight. They are suitable for application to all usual surfaces, for example brickwork, concrete—rough or smooth, lightweight blocks and plaster board. When the plaster compositions from which they are prepared contain an addition of hydrated lime the plasters may also be applied satisfactorily to metal lathing.

We claim:
1. Dry plaster compositions containing no lime consisting essentially of an intimate mixture of a calcium sulphate plaster and exfoliated vermiculite having a particle size in the range of about $150\mu$ to about $3000\mu$ in the proportions by weight of from 12:1 to 1:1 together with from 0.01% to 2% by weight of finely divided methylcellulose of a fineness less than about $150\mu$ based on the total weight of the calcium sulphate plaster and vermiculite.

2. Dry plaster compositions as claimed in claim 1 in which the calcium sulphate plaster is retarded calcium sulphate hemihydrate.

3. Dry plaster compositions as claimed in claim 1 in which the calcium sulphate plaster is an accelerated anhydrous calcium sulphate plaster.

4. Dry plaster compositions as claimed in claim 1 in which the exfoliated vermiculite has been treated with a volatile silane.

5. Dry plaster compositions as claimed in claim 4 in which the volatile silane is methyl trichlorsilane.

6. A process for the production of dry plaster compositions which comprises mixing a dry calcium sulphate plaster and exfoliated vermiculite having a particle size in the range of about 150µ to about 3000µ in the proportions of from 12:1 to 1:1 until substantially uniformly distributed, then adding from 0.01% to 2% by weight of finely divided methylcellulose of a fineness less than about 150µ based on the weight of the calcium sulphate plaster and vermiculite, said calcium sulphate plaster, said vermiculite and said methylcellulose being the essential ingredients of said dry plaster composition, and continuing the mixing for sufficient time to ensure that the methylcellulose is substantially uniformly distributed throughout the dry mass.

References Cited in the file of this patent
UNITED STATES PATENTS

| | | |
|---|---|---|
| 2,700,615 | Heijmer | Jan. 25, 1955 |
| 2,715,583 | Ziegler | Aug. 16, 1955 |
| 2,980,548 | Hampton | Apr. 18, 1961 |
| 2,993,016 | Sucetti | July 18, 1961 |
| 3,004,859 | Lichtenwalner | Oct. 17, 1961 |
| 3,042,535 | Hiltrop et al. | July 3, 1962 |
| 3,057,742 | Cunningham et al. | Oct. 9, 1962 |